Aug. 18, 1959 S. OTTO 2,899,783
ELECTROMAGNETIC PACKAGING APPARATUS
Filed July 5, 1955 3 Sheets-Sheet 1
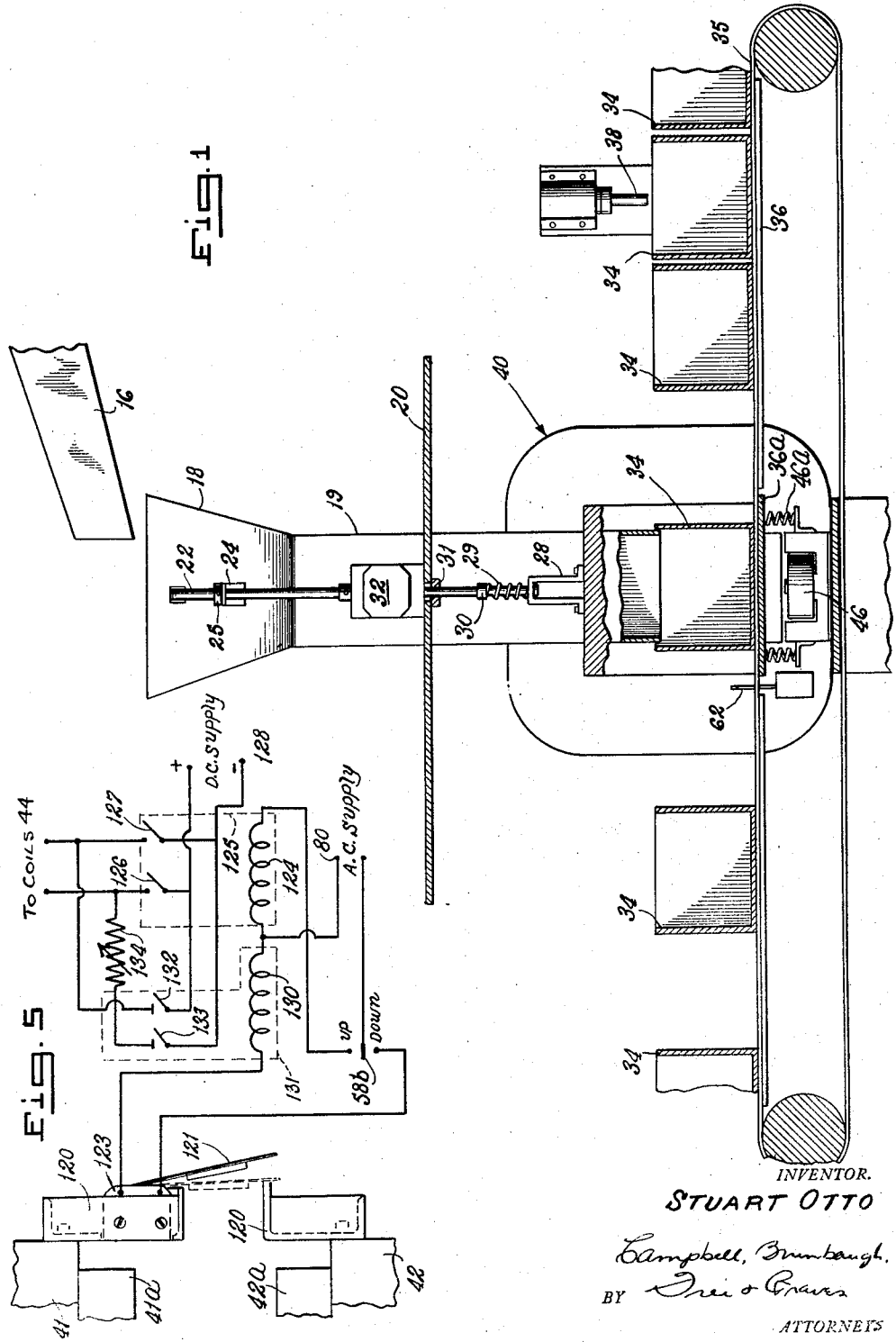
INVENTOR.
STUART OTTO
BY Campbell, Brumbaugh, Free & Graves
ATTORNEYS Aug. 18, 1959    S. OTTO    2,899,783
ELECTROMAGNETIC PACKAGING APPARATUS
Filed July 5, 1955    3 Sheets-Sheet 2
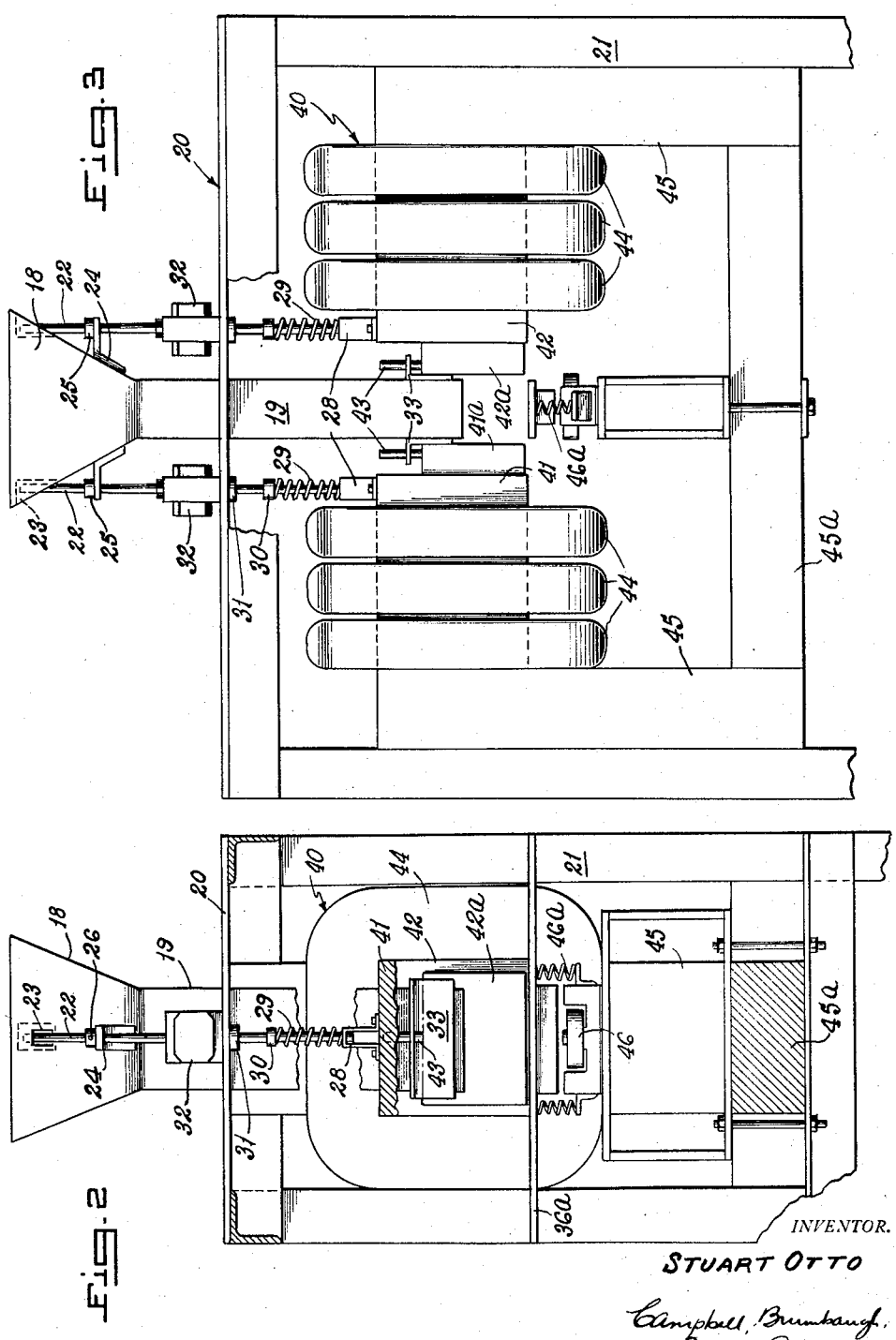
INVENTOR.
STUART OTTO
BY Campbell, Brumbaugh,
Free & Graves
ATTORNEYS

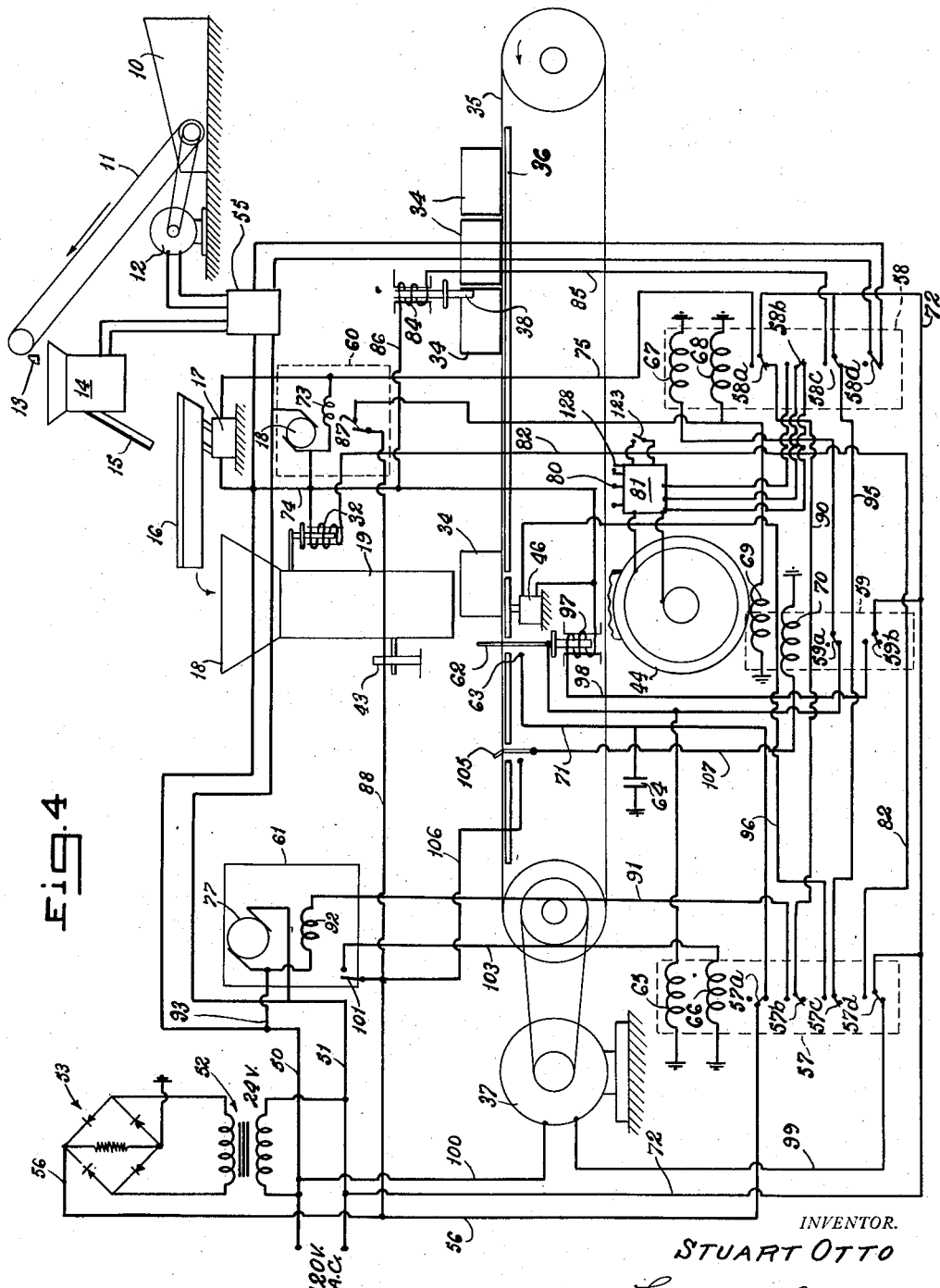

United States Patent Office 2,899,783
Patented Aug. 18, 1959

2,899,783
ELECTROMAGNETIC PACKAGING APPARATUS

Stuart Otto, Westport, Conn.

Application July 5, 1955, Serial No. 520,079

23 Claims. (Cl. 53—59)

The present invention relates to apparatus for packaging oblong objects capable of being magnetized, and more particularly, to apparatus for orienting such objects in parallelism when introducing them into a carton or container to utilize to the maximum the available space within the carton or container in the shortest possible time.

The apparatus of the present invention has general application to the handling and packaging of articles, such as nails, screws, bolts, pins, rivets, spikes, etc., however, in the embodiment shown in the drawings the apparatus is specifically adapted to the packaging of nails, screws and bolts.

Although various forms of such apparatus have been heretofore proposed, it is the object of the present invention to provide an improved and simplified fully automatic machine which will package such objects at great speed and without the constant attention of an operator.

In carrying out the present invention, nails are taken from a suitable source to a weighing mechanism by an intermittently operated conveyor. When a predetermined mass has been deposited in the weighing mechanism, the movement of the conveyor is interrupted and a magnetic dribble arrestor is actuated to prevent a superabundance of nails from being delivered to the weighing mechanism. The nails in the weighting mechanism are discharged into a vibrating conveyor which is operated for a predetermined period to bounce and thereby separate the nails, and at the same time, to feed the nails into the upper receiving end of a vertically movable chute, the lower end of which is disposed between the poles of an electromagnet.

Meanwhile, containers to be filled are released one at a time by a gate mechanism and advanced to the filling position beneath the vertically movable chute by an intermittently operated conveyor. The container thus advanced is stopped in filling position by a retractable stop in the raised position, which stop is operated to initiate the filling cycle. Responsive to the engagement of the empty container with the stop, the vibrating conveyor is actuated for a predetermined period to discharge the weighed mass of nails to the vertically movable chute, the vertically movable chute is lowered into telescoping relationship with the container, the electromagnet is actuated to orient the nails supplied to the chute in parallel array, the conveyor which advances the empty containers to filling position is stopped, and the gate which releases the containers one by one is released, allowing the released container to be moved by the conveyor the coasting distance of the conveyor before it comes to a complete halt, the coasting distance moving the container beyond the gate.

After a predetermined period, controlled by a timer device, the vibrating conveyor is turned off, the electromagnet is rapidly demagnetized by momentarily reversing the magnetic flux, thereby permitting the nails oriented in parallelism to be concentrated in the container, the automatic weigher is operated to dump the next weighed batch of nails into the vibrating conveyor where the batch remains until the conveyor is vibrated during the next cycle of operation, the gate is restored to its operative position to prevent the advance of the next container in line, a vibrator beneath the filled container is operated to settle the nails in the container, a second timer device is rendered operative to control the period of operation of the vibrator, and the stop in front of the container is retracted to an inoperative position so that the container may be moved away from the filling position as soon as the conveyor is started.

At the end of the predetermined period controlled by the second timer device, the chute is raised to inoperative position and the conveyor is started, moving the filled container away from the filling position and advancing the empty container previously released by the gate mechanism to the filling position. As the filled container travels away from the filling position, it trips a switch which causes the retractable stop to be raised into position to be engaged by the empty container moving toward filling position. This starts the next filling cycle of the machine.

The present invention includes an electrical control system to carry out the operation outlined above.

For a complete understanding of the present invention, reference may be had to the detailed description which follows and to the accompanying drawings in which:

Fig. 1 is a side elevation of the machine;

Fig. 2 is an enlarged view, partly in cross section, of part of the apparatus shown in Fig. 1;

Fig. 3 is a front elevation of the apparatus shown in Fig. 2;

Fig. 4 is a schematic drawing illustrating the electrical control circuit; and

Fig. 5 is a plan view of the poles of the electromagnet and the electrical circuit for reversing the polarity of the electromagnet to quickly de-energize it.

Referring to Fig. 4, nails stored in a storage bin 10 are carried by a conveyor 11 driven by a motor 12. The conveyor 11 discharges the nails over an electromagnetic dribble arrestor 13 into a weighing mechanism 14. When a predetermined mass of nails has been fed into the weighing mechanism, the weighing mechanism operates to interrupt the further motion of the conveyor and to magnetize the dribble arrestor 13 so that any nails that have been discharged from the conveyor will be attracted by and held to the dribble arrestor.

The nails in the weighing mechanism are then dumped through the chute 15 into a conveyor 16 vibrated by the vibrating unit 17. The nails are vibrated toward the discharge end of the conveyor 16 from which they pass into the upper funnel end 18 of a vertically disposed chute 19 mounted for upward and downward movement on the horizontal top plate 20 (see Figs. 1 to 3). The horizontal plate 20 is supported by vertical aluminum machine frame members 21.

As best shown in Figs. 1 to 3, the chute 19 is carried by a pair of guide rods 22 on opposite sides thereof. The funnel end 18 of the chute 19 is provided with recesses 23 to accommodate the extreme upper ends of the guide rods 22, and the outer side wall of the funnel is provided with outwardly extending brackets 24 having adjustable collars 25 formed integrally therein. The collars 25 are provided with set screws 26 so that the position of the chute 19 can be raised or lowered on the guide rods according to the height of the carton to be filled.

The lower ends of the guide rods are received in guide brackets 28 mounted above the magnetic cores 41, 42. Just above the guide brackets 28, the guide rods 22 carry springs 29 which are compressed between the upper surfaces of the brackets 28 and collars 30 carried by the guide rods. The guide rods carry stops 31 which engage the underside of the plate 20 to limit the upward travel of the chute 19. The compression springs urge the collars upwardly, thus normally maintaining the chute 19 in its uppermost raised position, as determined by the engagement of the stops 31 with the guide brackets 28. The lower end of the chute 19 is provided with outwardly extending flanges 33 which ride on vertical rods 43 (see Fig. 3), thereby guiding the lower end of the chute for vertical movement.

The downward movement of the chute 19 is effected by solenoids 32 mounted on the top plate 20. The energization of the solenoids 32 moves the guide rods downwardly against the pressure of the springs 29. Upon de-energization of the solenoids 32, the springs 29 restore the chute to its uppermost position.

The nails received in the chute 19 are immediately discharged into an empty container 34 delivered beneath the lower end of the chute. As best shown in Figs. 1 and 4, the empty containers 34 are carried by a moving conveyor 35 across a platform 36 to the filling position. The conveyor is intermittently driven by a motor 37. A solenoid actuated gate 38 holds the containers in slipping contact with the conveyor 36 and releases them one at a time for delivery to the filling position. When a container is in the filling position beneath the chute, it engages a stop finger 62 which prevents the further movement of the container by the conveyor. The stop finger closes a switch 63 (see Fig. 4) which initiates the filling operation, among other things energizing the solenoid 32 to move the lower end of the chute 19 into telescoping relationship with the open end of the container to insure that the nails falling into the chute from the vibrating hopper 16 will be received by the container.

As mentioned above, it has been found advantageous to package nails in substantial parallelism. By so packaging nails a saving in volume of from 20% for short flathead nails to as much as 60% for long thin nails is achieved. Accordingly, an electromagnet, denoted generally by the reference numeral 40, is stationed adjacent the chute 19 to produce a strong magnetic flux which will align them in parallelism. The electromagnet 40 comprises magnetic cores 41 and 42 terminating in pole pieces 41a and 42a on opposite sides of the chute and a plurality of coils 44 to magnetize the cores. The pole pieces 41a, 42a are oppositely disposed toward each other, leaving a gap therebetween for the chute 19 and the cartons 34 to be filled. To prevent the energization of the electromagnet from interfering with the vertical movement of the chute, but primarily to prevent the nails from magnetically adhering to the chute as they fall through it into the carton, the chute is constructed of a non-magnetic material, such as stainless steel.

As best shown in Fig. 3, the cores 41 and 42 are mounted to the upper ends of vertically disposed iron bars 45 and the lower ends of the bars 45 are connected by a horizontal iron bar 45a, the bars 45 and 45a forming a path for the magnetic flux. The bars 45 and 45a are, in turn, supported by the frame 21.

The nails oriented in parallelism in the chute 18 are caused to concentrate within the waiting container by demagnetization of the poles and the nails. This is accomplished by reversing the current through the magnetic coils and cutting the power completely to the magnetic coils as the flux approaches zero. Rapid demagnetization is necessary, otherwise the nails will not fall in horizontal parallel array into the container. It is, therefore, necessary to demagnetize the poles almost instantly so that the nails can fall horizontally by gravity, and also to speed the time required for packaging.

A section 36a of the platform 36 directly beneath the conveyor is resiliently supported by springs 46a above a vibrator 46, and the vibration imparted to the platform section 36a causes the nails to be further settled down evenly in the container.

At the completion of the container filling operation, the movement of the conveyor 35 is again initiated to conduct the filled container toward the discharge end of the conveyor and to conduct the next empty container in line to the filling position.

The electrical control for the apparatus can be best explained with reference to the schematic circuit diagram shown in Fig. 4.

An A.C. source of electrical power is supplied across the lines 50, 51. A step-down transformer 52 reduces the voltage, and a full wave bridge rectifier 53 makes available a voltage D.C. supply. The electrical control system includes two four-pole-double-throw latching type relays 57 and 58, a two-pole-double-throw latching type relay 59, a 0–15 second timer 60 and a 0–5 second timer 61. The power for driving the motors 77 and 78 of the timers 60 and 61, respectively, is supplied by the lines 50, 51.

The relay 57 controls the operation of the movable contracts 57a, 57b, 57c and 57d into engagement with upper and lower contacts, the coil 65 of the relay actuating the movable contacts into their upper position and the coil 66 moves them into their lower position. The movable contacts 58a, 58b, 58c and 58d of the relay 58 are controlled in like manner by coils 67, 68, the coil 67 moving the contacts to their upper position and the coil 68 moving them to their lower position. In like manner, the movable contacts 59a and 59b of the relay 59 are moved in engagement with their upper stationary contacts by the energization of the coil 69 and with the lower contacts by the energization of the coil 70.

At the beginning of the cycle of operation to be described, the movable contacts of the relays 57, 58 and 59 are in their lower positions, completing circuits through the contact 57d to drive the motor 37 through the contact 58d to operate the weigher 14 to discharge the contents thereof into the vibrating conveyor 16, and through the contact 57a to charge a capacitor 64.

An empty container 34 released by the gate 38 during the previous cycle of the machine is carried by the conveyor 35 until it comes into filling position directly beneath the chute 19, at which position the further advance of the container is prevented by the engagement of the container with a vertically movable stop finger 62 in the raised position. The engagement of the container with the stop finger 62 closes a switch 63 controlled by the stop finger, and the closing of the switch 63 completes a circuit to energize the coil 65 of the relay 57 and the coil 67 of the relay 58. The circuits are completed via the conductor 56 of the rectifier, the switch 57a of the relay 57 in the down position, the switch 63 and the conductor 71 to the coils 65, 67. The energization of the coils 65, 67 moves the contacts of the relays 57, 58 to their up positions. The movement of the contact 57a to its up position removes the power from the switch 63, but the previously charged capacitor 64 provides a pulse strong enough to insure that the coils 65, 67 are energized.

The movement of the contact 58d to the up position breaks a circuit established via the control box 55 to the weighing mechanism 14 and starts the motor 12 to advance the conveyor 11, all in a well-known manner.

The movement of the contact 58a of the relay 58 to the up position completes a circuit to initiate the operation of the timer 60, the circuit being completed via the A.C. line 51, the conductor 72, the contact 58a in the up position, and the wire 75 to the clutch coil 73, and via the conductor 74 to the A.C. line 50. The movement of the contact 58a to the up position also completes a circuit via the conductor 72, the contact 58a and the conductor 75 to the vibrating unit 17, and thence to the line 50. The vibrator 17, as mentioned above, vibrates the hopper 16, thereby discharging the nails therefrom into the upper end of the chute 19.

The movement of the contact 58a to the up position completes an electrical circuit via a control box 81 to energize the coils 44 of the electromagnet. The details of this circuit will be explained below in greater detail with reference to Fig. 5. For present purposes it suffices to say that the contact 58b establishes a circuit from the A.C. voltage supply impressed on the terminals 80 to energize a relay, which in turn establishes a circuit from the D.C. supply impressed across the terminals 128 to the coils 44.

The solenoids 32 are energized to lower the chute 19, thereby bringing the lower end into telescoping relation with the empty container, by the contact 57d in the up position. The circuit is completed from the A.C. line 51, the conductor 72, the contact 57d in the up position, the conductor 82 to the solenoid or solenoids 32, thence via the wire 74 to the A.C. line 50.

The gate 38 is adapted to be raised to inoperative or container releasing position by the energization of the solenoid 84. The solenoid 84 is energized by the movement of the contact 58c to the up position, the circuit being completed from the A.C. line 51 via the conductor 72, the contact 58c, the conductor 85 to the solenoid 84, and thence via the conductors 86 and 74 to the A.C. line 50. Since the circuit to the motor 37 which drives the conveyor 35 is broken when the contact 57d is moved to the up position, the container released by the raising of the gate 38 is translated by the conveyor a distance equal to the coasting distance of the conveyor when the motor is turned off, thereby advancing the released container past the gate 38.

At the end of the predetermined period of time (between 0 and 15 seconds) for which the timer 60 has been set, said period of time being determined by the time it takes to feed a pre-weighed batch of nails from the hopper 16 into the chute 19, the switch 87 of the timer 60 is closed. The closing of the switch 87 energizes the coil 68 of the relay 58, shifting the movable contacts 58a, 58b, 58c and 58d of the relay 58 into engagement with the stationary bottom contacts. The closing of the switch 87 also energizes the coil 69 of the relay 59, thereby moving the contacts 59a and 59b to their up positions. The circuit to both coils is completed from the D.C. line 56 via the conductor 88, the closed switch 87, and the coils 68 and 69 in parallel to ground.

The movement of the contact 58a to the down position breaks the circuit to the clutch coil 73 of the timer 60, the de-energization of the coil 73 automatically resetting the vibrator to zero, and also the circuit to the vibrator unit 17 so that the next batch of nails received by the hopper 16 will not be fed to the chute 19 until the succeeding cycle of operation. The movement of the contact 58b to down position breaks the circuit to the electromagnet 40, and also, as will be described below in reference with Fig. 5, momentarily reverses the polarity of the poles of the electromagnet to demagnetize it. This permits the nails to fall by gravity into the empty container below.

When the nails are received by the container, the vibrator 46 is operated to help the nails to settle more closely and evenly, and the duration of the operation of the vibrator 46 is controlled by the timer device 61.

The circuit for starting the timer 61 is completed from the A.C. line 51 via the conductor 72, the contact 58a in the down position, the conductor 90, the contact 57b in the up position, and the conductor 91 to the clutch coil 92 of the timer 61 and thence via the conductor 93 to the A.C. line 50. The energization of the coil 92 effects the engagement of the timer clutch through which the timer is driven by the motor 77. The circuit for operating the vibrator is completed from the A.C. line 51, the conductor 72, the contact 58c in the down position, the conductor 95, the contact 57c in the up position, and the conductor 96 to the vibrator 46 and from the unit via the conductor 74 to the A.C. line 50.

In preparation for the advancement of the filled container by the conveyor 35, the stop finger 62 is retracted to inoperative position out of the path of the filled container by the energization of the solenoid 97. The energization of the solenoid 97 is effected through a circuit from the A.C. line 51, the conductor 72, the contact 59b in its up position, and the conductor 98 to the solenoid 97 and thence via the conductor 74 to the A.C. line 50.

At the end of the predetermined period for which the timer 61 has been set (between 0 and 5 seconds) the normally open switch 101 of the timer is closed, completing a circuit from the D.C. line 56, the conductor 88, the switch 101 and the conductor 103 to the coil 66, thereby moving the contacts of the relay 57 to the down positions. Also, the motor 37 which drives the conveyor 35 is started by a circuit from the A.C. line 51, the conductor 72, the contact 57d of the relay 57 in the down position and the conductor 99 to the motor, and from the motor to the A.C. line 50 via the conductor 100.

The movement of the contact 57b to down position breaks the circuit to the clutch coil 92, permitting the timer 61 to reset itself to the start position. The chute solenoid 32 is de-energized by the movement of the contact 57d to the down position, thereby permitting the springs 29 to raise the lower end of the chute 19 out of telescoping relation with the container. Also, the operation of the vibrator 46 is stopped by the opening of the contact 57c.

The filled container as it is moved away from filling position by the conveyor 35 brushes past a leaf type switch 105 which projects upwardly through a slot in the platform 36, and the container in passing over it closes the switch to energize the coil 70 of the relay 59, thereby moving the contacts 59a and 59b to the down position. The circuit is completed for this purpose from the D.C. line 56 via the conductors 88, 106, the switch 105 and the conductor 107 to the coil 70. The movement of the contact 59b to the down position breaks the circuit to the solenoid 97, and the stop finger 62 is raised by means of a spring (not shown) into the path of the next empty container moving toward filling position. The engagement of this container with the stop finger 62 initiates the cycle of operation described above.

The electrical circuit for rapidly de-energizing the electromagnet 40 is best shown in Fig. 5. This figure shows the details of the control box 81 which is only generally represented in Fig. 4.

As shown in Fig. 5, steel bars 120 are connected at one end to the magnet cores 41, 42, but the steel bars are unconnected at the other end leaving a gap therebetween. A steel armature 121 is pivotally connected to one of the members 120, and when the electromagnet is operated, the armature 121 is attracted to the other member, thereby forming a path for the magnetic flux across the air gap.

When the armature 121 is thus attracted to operative position, it closes a switch 123 which, when the contact 58b of the relay 58 (see Fig. 4) is in the up position, establishes an electrical circuit to the coil 124 of the relay 125. The energization of the coil 124 closes switches 126, 127 to impress the D.C. voltage 128 across the coils 44 of the electromagnet.

At the end of the container filling operation, the contact 58b is moved to the down position, as described above in connection with Fig. 4, and the coil 130 of the relay 131 is energized, while at the same time the coil 124 of the relay 125 is de-energized. The energization of the coil 130 closes contacts 132, 133, thereby reversing the polarity of the D.C. voltage to the electromagnet coils 44 which, in turn, rapidly de-energizes the electromagnet. As the magnetic flux approaches "zero," the resilient armature 121 will be released, opening the switch 123. This releases the relay 131 and cuts off the supply of D.C. voltage to the electromagnet.

A rheostat 134 is placed in the circuit to limit the current passing through the electromagnet coils 44 during the demagnetizing cycle of the apparatus. By varying the resistance, the length of time required to demagnetize the coil can be controlled, the time duration being a function of the inductance of the circuit and the current.

As mentioned above, without provision for rapid demagnetization, the nails could not be removed quickly nor would they fall horizontally parallel down into the container. It is, therefore, necessary to provide means to demagnetize the electromagnet rapidly, almost instantaneously, so that the nails will fall horizontally by gravity.

The invention has been shown in preferred form and by way of example only, and it is, of course, evident that various modifications may be made therein without departing from the spirit of the invention. The invention is, therefore, not to be limited to any specified form or embodiment, except insofar as such limitations are expressly set forth in the claims.

I claim:

1. Apparatus for the packaging of magnetizable objects in parallelism into a container comprising an electromagnet having a pair of oppositely facing poles for producing a magnetic field of parallel lines of force, an elongated chute of non-magnetizable material having its lower end disposed between the pole faces, automatic means above the chute for intermittently introducing a predetermined weight of objects into the chute for parallel orientation thereof along said lines of force, automatic means for conveying an empty container into proper position under the chute for the purpose of filling the container with paralleled objects, automatic means for telescoping said chute into said container, automatic means for energizing said electromagnet, automatic means for demagnetizing said electromagnet, a vibrator for vibrating said container of parallel packed objects for a predetermined period of time, and means for moving the chute from its telescoped position within the container to permit the removal of said filled container from its filling position.

2. Apparatus as set forth in claim 1 wherein the means above the chute for intermittently introducing a predetermined weight of objects into the chute includes a conveyor from which objects are fed into the chute, and a vibrator for vibrating the conveyor for a predetermined period of time, thereby advancing the objects toward the discharge end of the conveyor.

3. Apparatus as set forth in claim 1 including a weigher, a conveyor for delivering the objects to the weigher, an electromagnetic dribble arrestor at the discharge end of the conveyor to prevent a superabundance of objects to be received by the weigher, and a discharge means from the weigher for discharging the weighed batch of objects, and timing means for automatically operating the weigher, the conveyor, the dribble arrestor, the discharge means in synchronized relation with the filling of the container.

4. Apparatus for packaging magnetizable objects comprising a chute of non-magnetizable material having an upper receiving end and a lower discharge end, an electromagnet, the poles of which are disposed on opposite sides of the chute to produce a magnetic flux across the chute, means for delivering a container to filling position beneath the discharge end of the chute, a source of electrical power, a timer, a switch actuated by the container in the filling position, relay means energized by the actuation of said switch, a circuit controlled by the relay means for moving relatively the chute and the container in filling position to bring the lower discharge end of the chute into telescoping relation with the container, a circuit controlled by the relay means for energizing the electromagnet, a circuit controlled by the relay means for starting the timer, and a switch actuated by the timer after a predetermined period for breaking the circuit which energizes the electromagnet, thereby releasing the objects held by the magnetic field.

5. Apparatus as set forth in claim 4 including a precharged capacitor for emitting a pulse upon actuation of the switch by the container in the filling position to energize said relay means.

6. Apparatus set forth in claim 4 wherein the switch actuated by the container in the filling position serves also as a stop for positioning the container, and including a circuit controlled by the switch actuated by the timer to retract the switch engaged by the container out of the path of the container.

7. Apparatus as set forth in claim 6 including a switch actuated by the filled container in moving away from filling position to restore the stop to raised position to engage a succeeding container.

8. Apparatus set forth in claim 4 including a means for delivering a batch of objects into the receiving end of the chute, a vibrator for effecting the discharge of the objects therefrom, and a circuit controlled by the relay means for starting the vibrator, said switch actuated by the timer stopping said vibrator.

9. Apparatus as set forth in claim 4 wherein a conveyor advances the containers to filling position and wherein the energization of the relay means stops the conveyor.

10. Apparatus as set forth in claim 9 including a solenoid operated gate for holding the empty containers on the moving conveyor, a circuit controlled by the energization of the relay means for releasing the gate, thereby permitting a container to be moved past the gate before the conveyor comes to a complete stop, the switch actuated by the timer controlling the movement of the gate to operative position.

11. Apparatus as set forth in claim 4 including a vibrator for vibrating the filled container after the filling operation to cause the nails to settle in the container, the vibrator and a second timer initiated by the actuation of the switch controlled by the first timer, and a switch actuated by the second timer to shut off the vibrator.

12. Apparatus as set forth in claim 4 including a second timer initiated by the actuation of the switch controlled by the first timer, and a switch controlled by the second timer to start the operation of the container advancing conveyor.

13. Apparatus for packaging magnetizable objects comprising a chute through which the objects are delivered to an empty container, an electromagnet having opposite poles for producing a magnetic field therebetween, said chute being disposed between said poles of the electromagnet, a D.C. voltage supply for energizing the electromagnet, means for reversing the polarity of said D.C. voltage supply to de-energize the electromagnet rapidly, a switch controlled by magnetic flux from said electromagnet, and means controlled by said switch when the magnetic flux is substantially zero for disconnecting the D.C. voltage supply from the electromagnet.

14. Apparatus for handling magnetizable objects to be filled in a container comprising an electromagnet having a pair of oppositely facing poles for producing a magnetic field across a gap between the poles, a chute of non-magnetizable material disposed between the poles, the lower discharge end of the chute communicating with a container in the filling position, means for moving relatively toward each other the lower discharge end of the chute and the container to be filled, such that the discharge end of the chute is in telescoping relationship with the container during the filling operation, means controlled by a container placed in the filling position to actuate said means for effecting the relative movement of the lower end of the chute and the container, a conveyor to advance an empty container to the filling position, a stop to hold the container in the filling position, means for stopping the movement of the conveyor during the filling operation, means for starting the movement thereof at the completion of the filling operation, a circuit for energizing the electromagnet, a power supply for said circuit, means for reversing the polarity of the electromagnet to accelerate its demagnetization, and means for breaking the circuit to the electromagnet when the demagnetization is substantially complete.

15. Apparatus as set forth in claim 14 including a vibrator to vibrate the container after the demagnetizing operation to settle the objects in the container, and means for operating the vibrator for a predetermined period.

16. Apparatus for handling magnetizable objects to be filled in a container comprising an electromagnet having a pair of oppositely facing poles for producing a magnetic field across a gap between the poles, a chute of non-magnetizable material disposed between the poles, the lower discharge end of the chute communicating with a container in the filling position, means for moving relatively toward each other the lower discharge end of the chute and the container to be filled, such that the discharge end of the chute is in telescoping relationship with the container during the filling operation, means controlled by a container placed in the filling position to actuate said means for effecting the relative movement of the lower end of the chute and the container, means for moving empty containers toward the filling position, a gate for arresting the movement of empty containers toward the filling position, and means for actuating the gate to release position to release a container.

17. Apparatus for packaging magnetizable objects comprising a chute through which the objects are delivered to an empty container, an electromagnet for producing a magnetic field across the chute to orient the objects before they are received in the container, means for energizing the electromagnet by a flow of an electrical current through the winding of the electromagnet to produce a magnetic field of given polarity, means for accelerating the demagnetization of the electromagnet by a flow of an electrical current in the opposite direction through the winding of the electromagnet to facilitate the settling of the objects into the container, and means controlled by the magnetic flux of the electromagnet for cutting off flow of the electric current through the winding of the electromagnet when the magnetic flux is substantially zero.

18. Apparatus for the packaging of magnetizable objects in parallelism into a container comprising an electromagnet having a pair of oppositely facing poles for producing a magnetic field of parallel lines of force, means for energizing the electromagnet, an elongated chute of non-magnetizable material having its lower end disposed between the pole faces, automatic means above the chute for intermittently introducing a predetermined weight of objects into the chute for parallel orientation thereof along said lines of force, automatic means for conveying an empty container into proper position under the chute for the purpose of filling the container with paralleled objects, automatic means for producing relative movement between said chute and said container to bring them into telescoping relationship, automatic means for accelerating the demagnetization of the electromagnet by reversing the flow of electrical current through the winding of the electromagnet to facilitate the settling of the objects within the container, means controlled by the magnetic flux of the electromagnet for cutting off flow of the electric current through the winding of the electromagnet when the magnetic flux is substantially zero, and automatic means for separating the chute and the container to permit the removal of said filled container from its filling position.

19. Apparatus for packaging magnetizable objects comprising an electromagnet having oppositely facing poles for producing a magnetic field, a chute disposed within the magnetic field, a platform beneath the chute for receiving thereon a carton to be filled, means controlled by the advance of the carton to the platform for initiating relative movement between the chute and the carton to bring the lower end of the chute and the carton into telescoping relationship, means operative to energize the electromagnet to produce a magnetic field, means controlled in timed relationship and subsequent to the energization of the electromagnet to dump a batch of the objects to be packaged into the chute, the objects in falling through the chute being oriented in parallel alignment by the magnetic field, means operative subsequent to the dumping operation to demagnetize the electromagnet, permitting the objects to settle in the carton, and means operative to separate the carton and the chute to permit the filled carton to be removed from the platform.

20. Apparatus for packaging magnetizable objects as set forth in claim 19 including means for vibrating the platform after the demagnetization of the electromagnet to cause the objects to settle in the carton and means for discharging the filled carton from the platform.

21. Apparatus for packaging magnetizable objects comprising an electromagnet having oppositely facing poles for producing a magnetic field, a chute disposed within the magnetic field, a platform beneath the chute for receiving thereon a carton to be filled, means for initiating relative movement between the chute and the carton to bring the lower end of the chute and the carton into telescoping relationship, means to energize the electromagnet to produce a magnetic field, means operative to dump a batch of the objects to be packaged into the chute, means operative to demagnetize the electromagnet, and means initiated by the advance of the carton to the platform to produce a sequence of automatic operations of the above-mentioned means by which the carton and chute are brought into telescoping relationship, the electromagnet is energized to produce a magnetic field, a batch of the objects is dumped into the chute so as to be oriented in parallel alignment while falling through the magnetic field, the electromagnet is deenergized, permitting the objects to settle in the carton, and the carton and the chute are separated to permit the filled carton to be removed from the platform.

22. Apparatus for packaging magnetizable objects comprising a chute through which the objects are delivered to an empty container, an electromagnet for producing a magnetic field across the chute to orient the objects before they are received in the container, means for energizing the electromagnet by a flow of an electrical current through the winding of the electromagnet to produce a magnetic field of given polarity, switch means for producing a flow of the electrical current through the winding of the electromagnet to reverse the polarity, thereby to accelerate the deenergization of the electromagnet for the purpose of facilitating the settling of the objects into the container, and means for actuating the switch means to cut off the flow of current to the winding of the electromagnet when the magnetic flux is substantially zero.

23. Apparatus for packaging magnetizable objects comprising a chute through which the products are delivered to an empty container, an electromagnet for producing a magnetic field across the chute to orient the objects before they are received in the container, means operable to supply current to the electromagnet to energize it in one direction to produce a magnetic field of given polarity, means thereafter operable to supply current to the electromagnet to energize it in the opposite direction to accelerate the demagnetization of the electromagnet, including the residual magnetization thereof, and means operable automatically to cut off the supply of current to the electromagnet when a state of substantially zero flux is reached.

References Cited in the file of this patent

UNITED STATES PATENTS

| | | |
|---|---|---|
| 1,169,251 | Gaffney | Jan. 25, 1916 |
| 1,442,405 | Hawthorne | June 16, 1923 |
| 2,526,882 | Landau | Oct. 24, 1950 |
| 2,581,042 | Otto | Jan. 1, 1952 |
| 2,699,283 | Okulitch et al. | Jan. 11, 1955 |
| 2,760,315 | Wilckens et al. | Aug. 28, 1956 |